US010357759B2

(12) United States Patent
D'Souza et al.

(10) Patent No.: US 10,357,759 B2
(45) Date of Patent: Jul. 23, 2019

(54) USE OF OLIVINE CATALYSTS FOR CARBON DIOXIDE REFORMING OF METHANE

(71) Applicant: SABIC Global Technologies B.V., Bergen op Zoom (NL)

(72) Inventors: Lawrence D'Souza, Thuwal (SA); Vinu Viswanath, Thuwal (SA); Ugo Ravon, Thuwal (SA); Aghaddin Mamedov, Sugar Land, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/317,445

(22) PCT Filed: Jul. 16, 2015

(86) PCT No.: PCT/US2015/040727
§ 371 (c)(1),
(2) Date: Dec. 9, 2016

(87) PCT Pub. No.: WO2016/011240
PCT Pub. Date: Jan. 21, 2016

(65) Prior Publication Data
US 2017/0120227 A1    May 4, 2017

Related U.S. Application Data

(60) Provisional application No. 62/025,782, filed on Jul. 17, 2014.

(51) Int. Cl.
*B01J 23/89* (2006.01)
*B01J 23/78* (2006.01)
(Continued)

(52) U.S. Cl.
CPC .......... *B01J 23/8946* (2013.01); *B01J 21/08* (2013.01); *B01J 23/002* (2013.01); *B01J 23/78* (2013.01);
(Continued)

(58) Field of Classification Search
CPC ....................................................... B01J 32/00
See application file for complete search history.

(56) References Cited

U.S. PATENT DOCUMENTS 3,308,070 A * 3/1967 Miller, Jr. ............ B01J 35/0026
501/81
4,234,451 A   11/1980 Jockel et al. ................. 252/373
(Continued)

FOREIGN PATENT DOCUMENTS

AU          759921         5/2003
AU      2014200165 A1      1/2014
(Continued)

OTHER PUBLICATIONS

Olivine by Hobart M. King Geology.com Downloaded on Oct. 31, 2018, pp. 1-6 (Year: 2018).*
(Continued)

*Primary Examiner* — Douglas B Call
(74) *Attorney, Agent, or Firm* — Norton Rose Fulbright US LLP

(57) ABSTRACT

Disclosed are metal oxide catalysts, and methods for their use, that includes a bulk metal oxide catalyst composed of at least two metals and nesosilicate. The catalyst is capable of catalyzing the carbon dioxide reforming of methane to produce hydrogen and carbon monoxide.

19 Claims, 4 Drawing Sheets where M1 and M2 are metal cations.

(51) Int. Cl.
| | |
|---|---|
| *B01J 37/00* | (2006.01) |
| *B01J 37/08* | (2006.01) |
| *B01J 37/04* | (2006.01) |
| *B01J 23/00* | (2006.01) |
| *C01B 3/40* | (2006.01) |
| *B01J 21/08* | (2006.01) |
| B01J 35/00 | (2006.01) |
| B01J 35/02 | (2006.01) |

(52) U.S. Cl.
CPC ....... *B01J 37/0009* (2013.01); *B01J 37/0036* (2013.01); *B01J 37/0063* (2013.01); *B01J 37/04* (2013.01); *B01J 37/08* (2013.01); *C01B 3/40* (2013.01); *B01J 35/002* (2013.01); *B01J 35/023* (2013.01); *B01J 2523/00* (2013.01); *C01B 2203/0238* (2013.01); *C01B 2203/0405* (2013.01); *C01B 2203/107* (2013.01); *C01B 2203/1064* (2013.01); *C01B 2203/1235* (2013.01); *C01B 2203/1241* (2013.01); *Y02P 20/52* (2015.11)

(56) References Cited

U.S. PATENT DOCUMENTS

| | | | | |
|---|---|---|---|---|
| 5,338,488 | A | 8/1994 | Choudhary et al. | 252/373 |
| 5,411,927 | A | 5/1995 | Choudhary et al. | 502/302 |
| 5,431,855 | A * | 7/1995 | Green | B01J 23/00 252/373 |
| 5,447,705 | A | 9/1995 | Petit et al. | 423/418.2 |
| 7,097,786 | B2 | 8/2006 | Dindi et al. | 252/373 |
| 7,449,424 | B2 | 11/2008 | Felix et al. | 502/240 |
| 8,119,099 | B2 | 2/2012 | Schiodt | 423/656 |
| 8,524,119 | B2 | 9/2013 | Jun et al. | 252/373 |
| 8,562,701 | B2 | 10/2013 | Heidenreich et al. | 48/197 R |
| 2002/0006374 | A1 | 1/2002 | Kourtakis et al. | 423/418.2 |
| 2009/0011925 | A1* | 1/2009 | Felix | B01J 23/04 502/60 |
| 2012/0190539 | A1 | 7/2012 | Zhang et al. | 502/306 |
| 2013/0109765 | A1 | 5/2013 | Jiang et al. | 518/702 |
| 2013/0116116 | A1 | 5/2013 | Schwab et al. | 502/328 |
| 2013/0330240 | A1 | 12/2013 | Apanel et al. | 422/142 |
| 2015/0126627 | A1* | 5/2015 | Apanel | C10K 1/003 422/141 |

FOREIGN PATENT DOCUMENTS

| | | |
|---|---|---|
| CA | 2635312 | 12/2009 |
| CN | 102416328 B | 4/2012 |
| CN | 103657654 A | 3/2014 |
| IN | 184285 B | 7/2000 |
| KR | 100892033 B1 | 4/2009 |
| KR | 101164024 B1 | 7/2012 |
| KR | 101166074 B1 | 7/2012 |
| KR | 101173028 B1 | 8/2012 |
| KR | 2013028024 A | 3/2013 |
| KR | 2013074393 A | 7/2013 |
| KR | 2014028400 | 3/2014 |
| WO | WO 01/89687 A1 | 11/2001 |
| WO | WO 2007044009 | 4/2007 |
| WO | WO 2013068905 | 5/2013 |
| WO | WO 2014014818 | 1/2014 |
| WO | WO2014014818 * | 1/2014 |

OTHER PUBLICATIONS

Arena et al., *Energy*, 68 (2014): 735-743.
Arena et al., *Waste Management*, 30 (2010): 1212-1219.
Corella et al., *Ind. Eng. Chem. Res.* 37 (1998): 4617-4624.
Courson et al., *Catalysis Today* 63 (2000): 427-437.
Courson et al., *Catalysis Today* 76 (2002): 75-86.
Courson et al., *Science and Technology of Advance Materials*, 3 (2002): 271-282.
Cui et al., *Natural Gas Conversion VIII* (2007): 281-286.
da Silva Neto et al., *Natural Gas Conversion VIII* (2007): 475-480.
International Preliminary Report on Patentability for PCT/US2015/040727, dated Nov. 4, 2016.
International Search Report and Written Opinion for PCT/US2015/040727, dated Sep. 30, 2015.
Lamber et al., *Journal of Catalysis* 105 (1987): 213-226.
Lumpkin et al., *American Mineralogist* 68 (1983): 164-176.
Martin et al. *Journal of Catalysis* 75 (1982): 233-242.
Ocsachoque et al., *Natural Gas Conversion VIII* (2007): 397-402.
Sadykov et al., *Natural Gas Conversion VIII* (2007): 361-366.
Virginie et al., *Effect of Fe-olivine on the tar content during biomass gasification in a dual fluidized bed.* Applied Catalysis B: Environmental, 2012. 121-122(0): p. 214-222.
Wang et al., *J. Chem. Technol. Biotechnol.* 75 (2000): 589-595.
Wang et al., *Natural Gas Conversion VIII* (2007): 275-280.
Wang et al., *Natural Gas Conversion VIII* (2007): 367-372.
West, A.R., *Solid State Chemistry and Its Applications* 1990: John Wiley & Sons Ltd.
Wu et al., *Catalyst Deactivation* (1987): 209-219.
Xu et al., *Chinese Journal of Catalysis* 30.11 (2009): 1076-1084.
Zhang et al., *Energy Conversion and Management* 48 (2007): 68-77.
Basile et al., *Catalysis Today* 142 (2009) 78-84.
Extended European Search Report for EP15822265.3 dated May 29, 2018.
European Communication Pursuant to Article 94(3) EPC, dated Feb. 21, 2019.
Yoshino et al., "Effect of temperature, pressure and iron content on the electrical conductivity of olivine and its high-pressure polymorphs," *Journal of Geophysical Research* 117, B08205, 2012.

* cited by examiner where M1 and M2 are metal cations.

USE OF OLIVINE CATALYSTS FOR CARBON DIOXIDE REFORMING OF METHANE

CROSS REFERENCE TO RELATED APPLICATIONS

This application is a national phase application under 35 U.S.C. § 371 of International Application No. PCT/US2015/040727 filed Jul. 16, 2015, which claims benefit to U.S. Provisional Patent Application No. 62/025,782 titled, "USE OF OLIVINE CATALYSTS FOR CARBON DIOXIDE REFORMING OF METHANE" filed Jul. 17, 2014. The entire contents of each of the above-referenced applications are incorporated herein by reference without disclaimer.

BACKGROUND OF THE INVENTION

A. Field of the Invention

The invention generally concerns the use of bulk metal oxide catalysts capable producing hydrogen ($H_2$) and carbon monoxide from methane ($CH_4$) and carbon dioxide ($CO_2$). In particular, the bulk metal oxide catalyst includes nesosilicate and two or more metals or metal compounds thereof.

B. Description of Related Art

Synthesis gas or "syngas" is a gas mixture that includes carbon monoxide and hydrogen. Syngas is typically used as an intermediary gas to produce a wide range of various products, such as mixed alcohols, hydrogen, ammonia, i-$C_4$ hydrocarbons, mixed alcohols, Fischer-Tropsch products (e.g., waxes, diesel fuels, olefins, gasoline, etc.) methanol, ethanol, aldehydes, alcohols, etc. Syngas can also be used as a direct fuel source, such as for internal combustible engines.

One of the more common methods of producing syngas is by oxidizing hydrocarbon gases such as methane. For instance, the controlled oxidation of methane can be carried out using carbon dioxide, water, or oxygen or a combination of such materials. For industrial scale applications, methane can be reformed into syngas by using steam, such as by the following reaction:

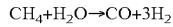

The ratio of $CO/H_2$ obtained in steam reforming process is about 0.33. Many applications, however, require a $CO/H_2$ of about 1.0. Such applications include production of aldehydes, alcohols and ammonia. Therefore, the current solution is to remove excess $H_2$ from the produced syngas using separation techniques that can decrease efficient production while simultaneously increasing associated costs. The ratio of $CO/H_2$ may be increased to about 1.0 by dry reforming of methane. In dry reforming of methane, methane is reacted with carbon dioxide or a mixture of carbon dioxide and oxygen as shown in the following equations:

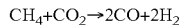

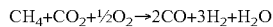

Catalysts are used to increase the rate of the reaction for both of the above reforming reactions. One problem associated with dry reforming (using carbon dioxide) of methane is that current catalysts are prone to sintering, which reduces the active surface of the catalyst. Another problem is supported catalysts that have good stability in retaining their structure and size over few hundred hours, eventually with time start growing in size. Thus, in dry reforming applications, as the particle size of the catalyst increases over time, the propensity to form agglomerations (e.g., coke) in the catalyst pore structure also increases.

SUMMARY OF THE INVENTION

Solutions to the sintering and coking problems encountered during dry reforming of methane have been discovered. Dry reforming of methane is also known as carbon dioxide reforming of methane. This process is performed in the absence of water or steam. At least one solution resides in the use of a bulk metal oxide catalyst capable of producing hydrogen ($H_2$) and carbon monoxide (CO) from a reactant gas stream composed of methane ($CH_4$) and carbon dioxide ($CO_2$) under substantially dry conditions to reduce sintering and coking of the catalytic materials at elevated temperatures. The reactant gas stream has substantially no water, or 0.1 wt. % or less of water. The bulk metal oxide catalyst includes a mixture of metals and nesosilicate. By way of example, a bulk metal oxide catalyst for dry reforming of methane includes nesosilicate, nickel (Ni), and manganese (Mn), magnesium (Mg) or calcium (Ca). Another example of a bulk metal oxide catalyst includes nesosilicate, nickel, a noble metal, and magnesium (Mg) or calcium (Ca). The bulk metal oxide catalyst is synthesized under conditions sufficient to produce a catalyst having an olivine crystal structure. Another solution to the sintering and coking catalyst problem resides in a supported catalyst, wherein the support includes minerals having olivine crystal structure.

In a particular aspect, there is disclosed a bulk metal catalyst metal oxide that includes at least two or more metals or two or more compounds thereof ($M^1$, $M^2$) and nesosilicate ($SiO_4$). In certain aspects, the bulk metal oxide is effective at elevated temperatures (e.g., greater than 700° C. or 800° C. or at a temperature range of greater than 700° C. to 950° C., or 750° C. to 800° C.) as a catalyst for syngas production or methane reformation reactions. At these temperatures the bulk metal oxide catalyst exhibits enhanced activity, coke resistance properties and sinter resistance properties. The bulk metal oxide catalyst is resistant to coke and/or at least one of the metals in the catalyst is inhibited from sintering upon heating of the bulk metal oxide catalyst. The metal oxide catalyst has a substantially olivine structure and/or is valence neutral. As determined by X-ray diffraction (XRD) methods, the bulk metal catalysts have an olivine crystal structure. The olivine crystal structures of the bulk metal catalyst are characterized by hexagonal close packed arrays of O anions ($O^-$) in that one-half of the octahedral interstices are occupied by $M^1$, $M^2$, and/or $M^3$ cations ($M^{1(+)}$, $M^{2(+)}$, and/or $M^{3(+)}$), and one-eighth of the tetrahedral interstices are occupied by Si cations ($Si^+$). The bulk metal oxide of the invention can be represented by the formulas $(M^1_{1-x}M^2_x)_2SiO_4$, where $x=0 \le x \ge 0.5$ and $M^1$ and $M^2$ are different; or $(M^1_{1-x}, M^2_x, M^3_y)_2SiO_4$ where $0 \le x \le 0.5$, $0 \le y \le 0.5$ and $(x+y) \le 0.5$, and $M^1$, $M^2$, and $M^3$ are different.

In certain aspects of the invention, one or more of the metals in the metal oxide catalyst of the invention can be catalytic metals. The catalytic material can be a metal from Group IIIB, Group IVB, Group VIB, Group VIIB, a lanthanide of the Periodic Table, or any combination thereof. In other aspects, the catalyst can be a combination of catalytic metals, an alkaline earth metal (Group IIA) and nesosilicate. In more particular aspects, $M^1$ includes at least one metal from Groups IIA, VIB, VIII, and Group IB or at least one compound thereof, and $M^2$ includes at least one metal from Group IIIB, IVB, VIB, VIII or at least one compound thereof, at least one lanthanide or at least one compound thereof, and where $M^1$ and $M^2$ are different. In still other aspects, the catalytic material $M^1$ includes Mg, Ca, barium (Ba), Mo, manganese (Mn), iron (Fe), cobalt (Co), copper (Cu), or compounds thereof. $M^2$ includes scandium (Sc), zirconium (Zr), molybdenum (Mo), chromium (Cr), ruthenium (Ru), osmium (Os), rhodium (Rh), iridium (Ir), Ni, palladium (Pd), platinum (Pt), lantheum (La), cesium (Ce), dysprosium (Dy), thulium (Tm), ytterbium (Yb), lutetium (Lu), cerium (Ce), titanium (Ti), niobium (Nb), hafnium (Hf), tantalum (Ta), tungsten (W), vanadium (V) or compounds thereof. In some aspects, $M^3$ includes noble metals from Group VIII and IB. In particular, $M^3$ includes Pt, Ru, Rh, Ir, Ag, Au, Pd or compounds thereof. In certain aspects, the bulk metal oxide catalyst is a mixture of Ni or a compound thereof, Mg or a compound thereof, and $SiO_4$. In still another aspect, the bulk metal oxide catalyst is a mixture of Ni or a compound thereof, Ca or a compound thereof, and $SiO_4$. In a particular aspect, the bulk metal is a mixture of Ni, noble metal, and $M^1$, where the noble metal is Pt, Ru, Rh, Ir, Ag, Au, Pd, or any combination thereof, and $M^2$ is Ca or Mg. In one aspect of the invention, the bulk metal oxide catalyst includes nickel, and the nickel is inhibited from sintering upon heating of the bulk metal oxide.

In certain aspects of the invention, a method of making a bulk metal oxide catalyst described herein includes (a) mixing $M^1$, $M^2$, and silicon dioxide ($SiO_2$) to form a mixture; and (b) subjecting the mixture to conditions such that $M^1$, $M^2$, and $SiO_2$ form a bulk metal oxide that includes $SiO_4$. The conditions in step (b) include molding the mixture under pressure, for example at a pressure ranging from about 10 to about 12 tons-force/sq. inch. The molded mixture can be subjected to the conditions of (a) heating the molded mixture to a temperature of about 1100-1300° C. at a rate of 1° C.; (b) holding the molded mixture at temperature of about 1100-1300° C. for about 24 hours, (c) cooling the heated molded mixture at a rate of about 1° C. to room temperature (d) crushing and grinding the material from step (c) and (e) repeating the steps (a) to (d). The crushing and grinding in step (d) can produce a powder form of the bulk metal oxide catalyst. In certain aspects, $M^1$, $M^2$ can be metal oxides. In a particular embodiment, $M^1$ is magnesium oxide (MgO) or calcium oxide (CaO) and $M^2$ is nickel oxide (NiO). $M^1$, $M^2$ and $SiO_2$ can be provided to step (a) in a 1:1:1 molar ratio.

In certain aspects of the invention, a supported catalyst capable of catalyzing reforming of methane under substantially dry conditions includes a metal or metal oxide from Group VIII and IB on a support. The support includes forsterite, monticelite, liebenbergite or any combination thereof. In certain aspects, the supported metal oxide catalyst is effective at elevated temperatures (e.g., greater than 700° C. or 800° C., or at a temperature range of greater than 700° C. to 900° C. or 750° C. to 850° C.) for syngas production or methane reformation reactions. At these temperatures the supported catalyst exhibits enhanced activity, coke resistance and sinter resistance properties. The supported catalyst is capable of inhibiting coke and/or at least one of the metals in the catalyst is inhibited from sintering upon heating of the bulk metal oxide catalyst. In a particular aspect of the invention the Group VIII metal or Group VIII metal compound includes nickel (for example, NiO). In certain aspects, at least one of the Group VIII metal or Group VIII metal compounds includes Pt, Pd, or any combination thereof. In further aspects, the supported catalyst includes Sc, Zr, Mo, Cr, Ru, Os, Rh, Ir, La, Ce, Dy, Tm, Yb, Lu, Co, or compounds thereof. The supported metal oxide catalyst can be prepare by (a) impregnating the support with at least one of the metals and (b) calcining the product of step (a) in a temperature range from about 1100° C. to about 1400° C. In some aspects, $M^1$ or $M^2$ includes Ni, and the Ni is inhibited from sintering upon heating of the supported metal oxide. In a particular aspect of the invention, the support is absent of iron (Fe). The method can further include subjecting the supported catalyst to a temperature at a range of greater than 700° C. or 800° C., or a range from 725° C., 750° C., 775° C., 800° C., 900° C., to 950° C., or at a range from 800° C. to 950° C., or from 800° C. to 900° C., while reducing or avoiding any significant coking and/or sintering of the catalyst, support material, and/or catalytic material.

Also disclosed is a method of producing hydrogen from methane and carbon dioxide that includes contacting a reactant gas mixture composed of methane and carbon dioxide with any one of the bulk metal oxide catalysts and/or or supported metal oxide catalysts discussed above and/or throughout this specification and producing a gaseous product stream that includes hydrogen and carbon monoxide. Further, there is disclosed a method of catalytically reforming a reactant gas mixture that includes contacting a reactant gas mixture that includes a hydrocarbon and an oxidant, with any one of the bulk metal oxide catalyst and/or or supported metal oxide catalysts discussed above and/or throughout this specification, under conditions sufficient to produce a gaseous mixture that includes carbon monoxide and hydrogen. Such conditions sufficient to produce the gaseous mixture can include a temperature range of 700° C. to 950° C. or a range from 725° C., 750° C., 775° C., 800° C., to 950° C., or from 700° C. to 950° C. or from 750° C. to 900° C., a pressure range of about 1 bara, and/or a gas hourly space velocity (GHSV) ranging from 1,000 to 100,000 $h^{-1}$. In particular instances, the hydrocarbon includes methane. In certain aspects, the oxidant comprises carbon dioxide, oxygen, or any combination thereof. In a particular instance, the hydrocarbon includes methane and the oxidant is carbon dioxide or a mixture of carbon dioxide and oxygen. The ratio of carbon monoxide to hydrogen in the produced gaseous mixture is approximately 0.35:1 to 1:1.

In the context of the present invention embodiments 1 to 45 are described. Embodiment 1 is a bulk metal oxide catalyst capable of producing hydrogen ($H_2$) and carbon monoxide (CO) from methane ($CH_4$) and carbon dioxide ($CO_2$), the metal oxide including at least two or more metals or two or more compounds thereof ($M^1$, $M^2$) and nesosilicate ($SiO_4$), wherein the metal oxide is capable of producing the $H_2$ from the $CH_4$ and the $CO_2$ under substantially dry conditions. Embodiment 2 is the bulk metal oxide catalyst of embodiment 1, wherein $M^1$ includes at least one metal from Groups IIA, VIB, VIIB, VIII, and Group IB or at least one compound thereof, and $M^2$ includes at least one metal from Group IIIB, IVB, VIB, VIII or at least one compound thereof, at least one lanthanide or at least one compound thereof, wherein $M^1$ and $M^2$ are different. Embodiment 3 is the bulk metal oxide catalyst of any one of embodiments 1 or 2, wherein $M^2$ includes scandium (Sc), zirconium (Zr), molybdenum (Mo), chromium (Cr), ruthenium (Ru), osmium (Os), rhodium (Rh), iridium (Ir), nickel (Ni), palladium (Pd), platinum (Pt), lanthanum (La), cesium (Ce), dysprosium (Dy), thulium (Tm), ytterbium (Yb), lutetium (Lu), cerium (Ce), titanium (Ti), niobium (Nb), hafnium (Hf), tantalum (Ta), tungsten (W), vanadium (V) or any compound thereof. Embodiment 4 is the bulk metal oxide catalyst of any one of embodiments 1 to 3, wherein $M^1$ comprises magnesium (Mg), calcium (Ca), barium (Ba), molybdenum (Mo), manganese (Mn), iron (Fe), cobalt (Co), copper (Cu), or any compound thereof. Embodiment 5 is the bulk metal oxide catalyst of embodiment 1, wherein $M^1$ comprises Mg or a compound thereof, and $M^2$ comprises Ni or a compound thereof. Embodiment 6 is the bulk metal oxide catalyst of embodiment 1, wherein $M^1$ comprises Ca or a compound thereof $M^2$, and comprises Ni or a compound thereof. Embodiment 7 is the bulk metal oxide catalyst of embodiment 1, further comprising $M^3$, wherein $M^3$ comprises a metal from Group VIII or a compound thereof, and wherein $M^1$, $M^2$ and $M^3$ are different. Embodiment 8 is the bulk metal oxide catalyst of embodiment 7, wherein $M^3$ comprises Pt, Ru, Rh, Ir, Au, Ag, Pd or any compounds thereof. Embodiment 9 is the bulk metal oxide catalyst of any one of embodiments 1 to 8, wherein the metal oxide has a substantially olivine structure. Embodiment 10 is the bulk metal oxide catalyst of any one of embodiments 1 to 9, wherein the metal oxide is valence neutral. Embodiment 11 is the bulk metal oxide catalyst of any one of embodiments 1 to 10, wherein the metal oxide is represented by the formula of: $(M^1_{1-x}, M^2_x)_2 SiO_4$, where $0 \le x \le 0.5$, $M^1$ and $M^2$ are different. Embodiment 12 is the bulk metal oxide catalyst of any one of embodiments 1 to 10, wherein the metal oxide is represented by the formula of: $(M^1_{1-x}, M^2_x, M^3_y)_2 SiO_4$, where $0 \le x \le 0.5$, $0 \le y \le 0.5$ and $(x+y) \le 0.5$, $M^1$, $M^2$, and $M^3$ are different. Embodiment 13 is the bulk metal oxide catalyst of any one of embodiments 1 to 12, wherein the metal oxide catalyst has a crystal structure comprising hexagonal closest packed arrays of oxygen anions ($O^-$) in that one-half of the octahedral interstices are occupied by $M^1$ cations, $M^2$ cations, and/or $M^3$ cations, and one-eighth of the tetrahedral interstices are occupied by Si cations ($Si^+$). Embodiment 14 is the bulk metal oxide catalyst of any one of embodiments 1 to 13, wherein the metal oxide catalyst is resistant to coke formation. Embodiment 15 is the bulk metal oxide catalyst of any one of embodiments 1 to 14, wherein at least one of the metals of the metal oxide is inhibited from sintering upon heating of the metal oxide. Embodiment 16 is the bulk metal oxide catalyst of any one of embodiments 1 to 14, wherein $M^2$ comprises Ni, and the Ni is inhibited from sintering upon heating of the metal oxide. Embodiment 17 is the bulk metal oxide catalyst of any one of embodiments 1 to 16, wherein the metal oxide is comprised in a reactant that includes $CH_4$. Embodiment 18 is the bulk metal oxide catalyst of any one of embodiments 1 to 17, wherein the metal oxide is comprised in a reactant that includes $CO_2$. Embodiment 19 is the bulk metal oxide of any one of embodiments 1 to 18, wherein under substantially dry conditions the catalyst comprises 0.1 wt. % or less of water by weight.

Embodiment 20 is a method of making a bulk metal oxide catalyst of any one of embodiments 1 to 19, the method including (a) mixing $M^1$, $M^2$, and silicon dioxide ($SiO_2$) to form a mixture; and (b) subjecting the mixture to conditions such that $M^1$, $M^2$, and $SiO_2$ form a bulk metal oxide having an olivine crystal structure, the olivine crystal structure including nesosilicate ($SiO_4$). Embodiment 21 is the method of embodiment 20, wherein the conditions comprise molding the mixture under pressure. Embodiment 22 is the method of embodiment 20, wherein the conditions comprise molding the mixture under pressure ranging from about 10 tons-force/sq.inch to about 15 tons-force/sq.inch. Embodiment 23 is the method of any one of embodiments 20 to 22, wherein the conditions include (a) heating the molded mixture to a temperature of about 1300° C. at a rate of 1° C.; (b) holding the molded mixture at temperature of about 1300° C. for about 24 hours; (c) cooling the hot molded mixture at a rate of about 1° C. to room temperature; (d) crushing and grinding the molded mixture from step (c); and (d) repeating steps (a) to (d). Embodiment 24 is the method of any one of embodiments 20 to 23, wherein the conditions include grinding the metal oxide into a powder. Embodiment 25 is the method of any one of embodiments 20 to 24, wherein $M^1$ is magnesium oxide (MgO) or calcium oxide (CaO), and $M^2$ is nickel oxide (NiO). Embodiment 26 is the method of any one of embodiments 20 to 25, wherein mixing includes providing $M^1$, $M^2$ and $SiO_2$ in a 1:1:1 molar ratio.

Embodiment 27 is a metal oxide catalyst capable of producing $H_2$ and CO from $CH_4$ and $CO_2$, the metal oxide catalyst including one or metals from Group VIII or one or more compounds thereof on a support, the support including forsterite, monticelite, or any combination thereof, and wherein the metal oxide catalyst is capable of producing the $H_2$ from the $CH_4$ and the $CO_2$ under substantially dry conditions. Embodiment 28 is the metal oxide catalyst of embodiment 27, wherein at least one of the Group VIII metals or at least one of the compounds thereof comprises Ni. Embodiment 29 is the metal oxide catalyst of any one of embodiments 27 or 28, wherein at least one of the Group VIII or at least one of the compounds thereof comprises Pt, Pd, and combinations thereof. Embodiment 30 is the metal oxide catalyst of any one of embodiments 27 to 29, wherein the metal oxide further comprises Sc, Zr, Mo, Cr, Ru, Os, Rh, Ir, La, Ce, Dy, Tm, Yb, Lu, Co, or any compound thereof. Embodiment 31 is the metal oxide catalyst of any one of embodiments 27 to 30, wherein the support is impregnated with at least one of the metals. Embodiment 32 is the metal oxide catalyst of any one of embodiments 27 to 31, wherein the metal oxide catalyst is calcined at a temperature ranging from 1200° C. to about 1400° C. Embodiment 33 is the metal oxide catalyst of any one of embodiments 27 to 32, wherein the metal oxide is resistant to coke formation. Embodiment 34 is the metal oxide catalyst of any one of embodiments 27 to 33, wherein at least one of the metals of the metal oxide is inhibited from sintering upon heating of the metal oxide. Embodiment 35 is the metal oxide catalyst of any one of embodiments 27 to 33, wherein $M^1$ or $M^2$ includes Ni, and the Ni is inhibited from sintering upon heating of the metal oxide. Embodiment 36 is the metal oxide catalyst of any one of embodiments 27 to 35, wherein a portion of the metal oxide catalyst is comprised in a reactant comprising $CH_4$. Embodiment 37 is the metal oxide catalyst of any one of embodiments 27 to 36, wherein a portion of the metal oxide catalyst is comprised in a reactant comprising $CO_2$. Embodiment 38 is the metal oxide catalyst of any one of embodiments 27 to 37, wherein the support is absent of iron (Fe).

Embodiment 39 is a method of producing $H_2$ and CO that includes (a) contacting a reactant gas stream with a metal oxide catalyst under substantially dry conditions, the reactant gas stream comprising $CH_4$ and $CO_2$; and the metal oxide catalyst is the metal oxide catalyst of any one of embodiments 1 to 19 or 27 to 38; and (b) producing a gaseous product stream comprising the $H_2$ and CO. Embodiment 40 is the method of embodiment 39, wherein a ratio of $H_2$ to CO ranges from 0.3 to 1.0. Embodiment 41 is the method of any one of embodiments 39 or 40, further including inhibiting coke formation. Embodiment 42 is the method of any one of embodiments 39 to 41, wherein the reactant gas stream includes 0.1 wt. % or less of water. Embodiment 43 is the method of any one of embodiments 39 to 42, wherein contacting is performed at a temperature of about 700° C. to about 950° C., a pressure of about 1 bara, and a gas hourly space velocity ranging from about 1,000 to about 100,000 $h^{-1}$.

Embodiment 44 is a method of producing a gaseous mixture comprising contacting a reactant gas mixture that includes a hydrocarbon and oxidant with the metal oxide catalyst of any one of embodiments 1 to 19 or 27 to 38 under conditions sufficient to produce a gaseous mixture comprising hydrogen and carbon monoxide. Embodiment 45 is the method of embodiment 44, wherein the oxidant is carbon dioxide.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "bulk metal oxide catalyst" as that term is used in the specification and/or claims, means that the catalyst includes one metal, and does not require a carrier or a support.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The catalysts of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the catalysts of the present invention are their abilities to catalyze dry reforming of methane.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

The currently available catalysts used to reform hydrocarbons into syngas are prone to sintering and coking, which can lead to inefficient catalyst performance and ultimately failure of the catalyst after relatively short periods of use. This can lead to inefficient syngas production as well as increased costs associated with its production.

A discovery has been made that avoids the sintering issues described above. The discovery is based on the use of bulk metal oxide catalysts and/or a supported catalyst containing forsterite, liebenbergite, monticelite, or any combination thereof. Without wishing to be bound by theory, it is believed that the solid state synthesis method and special calcination conditions to produce a catalyst having an olivine lattice can reduce or prevent agglomeration of the catalytic material and/or the support material at elevated temperatures, thereby reducing or preventing sintering of the materials.

These and other non-limiting aspects of the present invention are discussed in further detail in the following sections.

A. Nesosilicates

Figure 1:
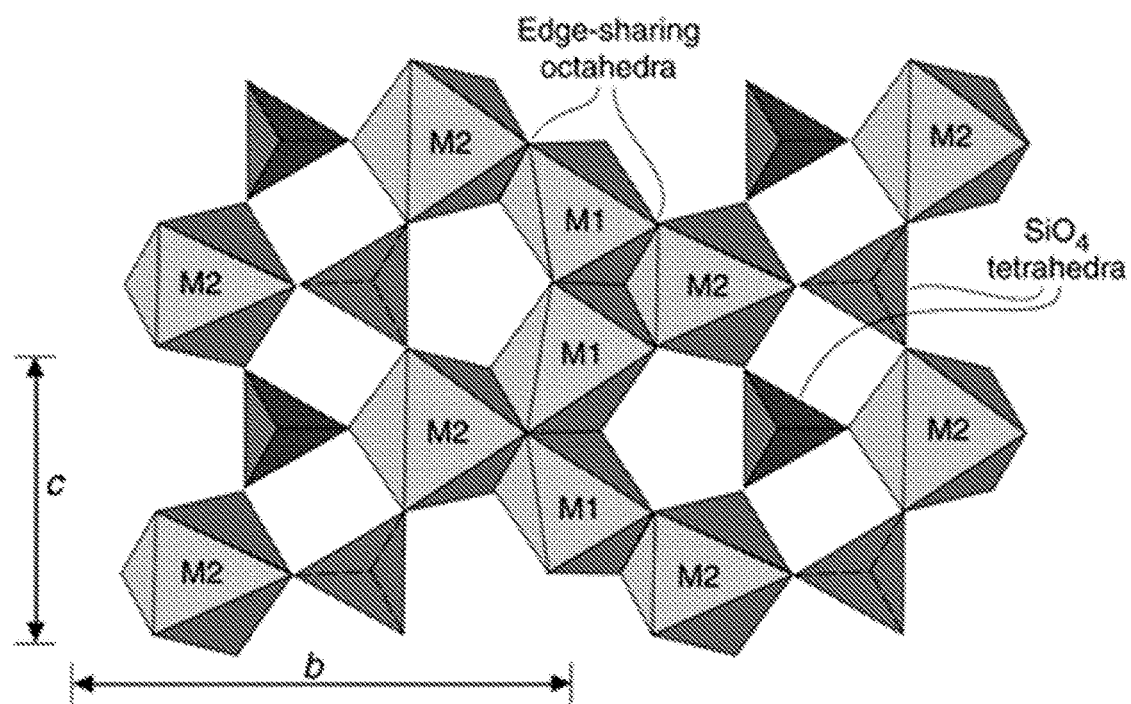
FIG. 1 depicts a polyhedral structure of an olivine structure that includes nesosilicate and two metal cations.

The silicates used in the context of this invention are nesosilicates, $SiO_4^{4-}$ anions. In a nesosilicate compound, counter ions (cationic metals) are coordinated by the four silicate oxygen atoms. The coordination with the cationic metals with the four oxygen atoms provides a nesosilicate (i.e., an olivine) crystal structure. In an olivine crystal structure, the $SiO_4^{4-}$ anions are isolated from each other (i.e., the Si cations do not share oxygen atoms). The olivine structure is characterized by hexagonal close packed arrays of $O^-$ anions in that one-half of the octahedral interstices are occupied by the cations of the metals of the invention, and one-eighth of the tetrahedral interstices are occupied by Si cations. FIG. 1 depicts a polyhedral structure of an olivine structure that includes nesosilicate and two metal cations. Nesosilicates of the invention can be prepared by heating silicon dioxide at high temperatures in the presence of other metal oxides. In another aspect of the invention, naturally occurring olivine minerals can be used as supports for the metals of the invention. Examples of olivine minerals that can be used as supports include, but are not limited to, the minerals of forsterite ($Mg_2SiO_4$), monticelite ($CaMgSiO_4$), and combinations thereof. In a particular aspect of the invention, the support does not include iron or iron compounds.

B. Metals

The metals that can be used in the context of the present invention to create bulk metal oxides or supported catalysts include a metal from Group IIA or compound thereof, a metal from Group IB or compound thereof, a metal from Group IIIB or compound thereof, a metal from Group IVB or compound thereof, a metal from Group VIB or compound thereof, a metal from Group VIII or compound thereof, at least one lanthanide or compound thereof, or any combination thereof. The metals or metal compounds can be purchased from any chemical supplier such as Sigma-Aldrich, Alfa-Aeaser, Strem, etc. Group IIA metals (alkaline-earth metals) and Group IIA metal compounds include, but are not limited to, Mg, MgO, Ca, CaO, Ba, BaO, or any combinations thereof. Group IB metals and Group IB metal compounds include, but are not limited to, Cu and CuO. Group IIIB metals and Group IIIB metal compounds include, but are not limited to, Sc, $Sc_2O_3$, the lanthanides or lanthanide compounds, or any combination thereof. Lanthanides that can be used in the context of the present invention to create lanthanide oxides include La, Ce, Dy, Tm, Yb, Lu, or combinations of such lanthanides. Non-limiting examples of lanthanide oxides include $CeO_2$, $Dy_2O_3$, $Tm_2O_3$, $Yb_2O_3$, $Lu_2O_3$, or $La_2O_3$, or any combination thereof. Lanthanide oxides can be produced by methods known in the art such as by high temperature (e.g., >500° C.) decomposition of lanthanide salts or by precipitation of salts into respective hydroxides followed by calcination to the oxide form. Group IVB metals and Group IV metal compounds include, but are not limited to, Zr and $ZrO_2$. Group VIB metals and Group VI metal compounds include, but are not limited to, Cr, $Cr_2O_3$, Mo, $Mo_2O_3$, or any combination thereof. Group VIII metals and metal compounds include, but are not limited to, Ru, $RuO_2$, Os, $OsO_2$, Co, $Co_2O_3$, Rh, $Rh_2O_3$, Ir, $Ir_2O_3$, Ni, $Ni_2O_3$, Pd, $Pd_2O_3$, Pt, $Pt_2O_3$, or combinations thereof.

Metal catalysts for the production of hydrogen and carbon monoxide from hydrocarbons and carbon dioxide include two or more of the above described metal or metals compounds in combination with nesosilicate. Catalytic material can be mixed with the nesosilicate. Catalytic material includes a catalytic metal, such as Sc, Zr, Mo, Cr, Ru, Os, Co, Rh, Ir, Ni, Pd, Pt, Cu, La, Ce, Dy, Tm, Yb, or Lu or any combination thereof. Base metals can include Mg, Ca, Ba, or any combination thereof. Metal compounds used in the catalysts of the invention include, for example, $Sc_2O_3$, $ZrO_2$, $Mo_2O_3$, $Cr_2$, $O_3$, $RuO_2$, $OsO_2$, $CO_2O_3$, $Rh_2O_3$, $Ir_2O_3$, $Ni_2O_3$, $Pd_2O_3$, $Pt_2O_3$, $La_2O_3$, $CeO_2$, $Dy_2O_3$, $Tm_2O_3$, $Yb_2O_3$, $Lu_2O_3$ MgO, CaO, BaO, or CuO. At least two metals, or at least three metals used in the catalyst can be combined such that the overall formula of the catalyst is

$$(M^1_{1-x}M^2_x)_2SiO_4 \qquad (I)$$

where $x=0\leq x\leq 0.5$ and $M^1$ and $M^2$ are different;
or

$$(M^1_{1-x},M^2_x,M^3_y)_2SiO_4 \qquad (II)$$

where $0\leq x\leq 0.5$, $0\leq y\leq 0.5$ and $(x+y)\leq 0.5$, and $M^1$, $M^2$, and $M^3$ are different.

As shown in formula (II), the ratio of $M^1$, $M^2$, to $M^3$ is adjusted to compensate for the third metal. The third metal can be a noble metal. In preferred embodiments, $M^1$ is calcium or magnesium or manganese, $M^2$ is nickel, and $M^3$ is a noble metal (e.g., Pt, Ru, Rh, Pd, or Ir). If four or more metals are contemplated, for example a mixture of Ni, Ca, Mg and Pt, the amount of $M^1$ and $M^2$ is adjusted to account for the fourth metal. It should be understood, that the number of metals can be varied as long as the empirical formula for the olivine structure of $(AB)_2SiO_4$, where A and B are metals, is preserved.

C. Preparation of Catalysts

The bulk metal oxide catalyst of the present invention can be made by processes known in the art that provide an olivine lattice structure, for example, a solid state reaction with catalytic and/or base metals, and silicon oxide. A non-limiting example includes, mixing stoichiometric molar amounts of reactants until a homogeneous powder is formed. In embodiments when a noble metal is added as a third metal, the amount of at least one other catalytic material (for example, $M^2$, when $M^2$ is nickel) is adjusted such that the overall formula for the catalyst is $(M^1_{1-x}, M^2_x, M^3_y)_2SiO_4$ where $0\leq x\leq 0.5$, $0\leq y\leq 0.5$ and $(x+y)\leq 0.5$, and $M^1$, $M^2$, and $M^3$ are different. The powdered mixture can be dried at temperatures at about 115° C. to about 125° C. for 8 to 12 hours. The dried mixture can be mixed with force (for example, grinding, milling, or crushing), and then molded under a pressure of about 10 Tons-force/sq.inch to about 12 Tons-force/sq.inch (154 MPa to 185 MPa) to form pellets. The pellets may be any shape or size (for example, cylindrical, rods, round, elliptical, etc.). The pellets can be calcined by heating the pellets to a temperature between 1250° C. and 1350° C. at a rate of 1° C. per minute and holding at between 1250° C. and 1350° C. for 24 hours, and then cooled at a rate of about 1° C. per minute to ambient temperature (about 72° C.). The calcined pellets are then powdered using force (for example, crushed and ground). The resulting catalyst has an olivine structure that has discrete $SiO_4^{4-}$ anions in the crystal lattice, where the $O^-$ anions of the silicate are coordinated with the metals of the invention.

The supported metal catalyst of the present invention can be made by generally known catalyst preparation techniques. In some embodiments, the support may be combined with metal to form a catalyst. The support can include forsterite, monticelite, liebenbergite, or any combination thereof. In some aspects of the invention, the support is heat-treated at temperatures prior to combining with a metal of the invention. In some embodiments, impregnation aids may be used during preparation of the catalyst. In certain embodiments, the support may be combined with a metal solution. The metal solution may be mixed with the support and/or sprayed on the support. The metal solution can include Group VIII metals or Group VIII metal compounds, for example, Ni. In some aspects, the metal solution includes Group VIII metals or metal compounds in combination with noble metals, such as Pt and/or Pd. In certain aspects, the metal solution includes Ni, Pt, Pd, Sc, Zr, Mo, Cr, Ru, Os, Rh, Ir, La, Ce, Dy, Tm, Yb, Lu, Co, or any combination thereof. The amount of metal or metal precursor is chosen such that supported catalyst has a total metal content of from 5-15 wt. %. In a non-limiting example, the catalyst is prepared using an incipient impregnation technique. The metal impregnated support can be dried at 80 to 120° C. for about 1 to 3 hours. The dried catalyst can be heat treated (e.g., calcined) at a temperature ranging from 800° C. to about 900° C. for about 3 hours or a time determined to be sufficient to oxide the metals impregnated on the support.

As illustrated in the Examples section, the produced bulk metal oxide catalyst and supported metal catalysts of the invention are sinter and coke resistant materials at elevated temperatures, such as those typically used in syngas production or methane reformation reactions (e.g., 700° C. to 950° C. or a range from 725° C., 750° C., 775° C., 800° C., 900° C., to 950° C.). Further, the produced catalysts can be used effectively in carbon dioxide reforming of methane reactions at a temperature range from 700° C. to 950° C. or from 800° C. to 900° C., a pressure range of 1 bara, and/or at a gas hourly space velocity (GHSV) range from 1000 to 10000 $h^{-1}$.

D. Carbon Dioxide Reforming of Methane

Also disclosed is a method of producing hydrogen and carbon monoxide from methane and carbon dioxide. The method includes contacting a reactant gas mixture of a hydrocarbon and oxidant with any one of the bulk metal oxide catalysts and/or or supported metal oxide catalysts discussed above and/or throughout this specification under sufficient conditions to produce hydrogen and carbon monoxide at a ratio of 0.35 or greater, from 0.35 to 0.95, or from 0.6 to 0.9. Such conditions sufficient to produce the gaseous mixture can include a temperature range of 700° C. to 950° C. or a range from 725° C., 750° C., 775° C., 800° C., to 900° C., or from 700° C. to 950° C. or from 750° C. to 900° C., a pressure range of about 1 bara, and/or a gas hourly space velocity (GHSV) ranging from 1,000 to 100,000 $h^{-1}$. In particular instances, the hydrocarbon includes methane and the oxidant is carbon dioxide. In other aspects, the oxidant is a mixture of carbon dioxide and oxygen. In certain aspects, the carbon formation or coking is reduced or does not occur on the bulk metal oxide catalyst or the supported catalyst and/or sintering is reduced or does not occur on the bulk metal oxide catalyst or the supported catalyst. In particular instances, carbon formation or coking and/or sintering is reduced or does not occur when the bulk metal oxide catalyst and/or supported catalyst is subjected to temperatures at a range of greater than 700° C. or 800° C. or a range from 725° C., 750° C., 775° C., 800° C., 900° C., to 950° C. In particular instances, the range can be from 700° C. to 950° C. or from 750° C. to 900° C.

In instances when the produced catalytic material is used in dry reforming methane reactions, the carbon dioxide in the gaseous feed mixture can be obtained from various sources. In one non-limiting instance, the carbon dioxide can be obtained from a waste or recycle gas stream (e.g. from a plant on the same site, like for example from ammonia synthesis) or after recovering the carbon dioxide from a gas stream. A benefit of recycling such carbon dioxide as starting material in the process of the invention is that it can reduce the amount of carbon dioxide emitted to the atmosphere (e.g., from a chemical production site). The hydrogen in the feed may also originate from various sources, including streams coming from other chemical processes, like ethane cracking, methanol synthesis, or conversion of methane to aromatics. The gaseous feed mixture comprising carbon dioxide and hydrogen used in the process of the invention may further contain other gases, provided that these do not negatively affect the reaction. Examples of such other gases include oxygen and nitrogen. The gaseous feed mixture has is substantially devoid of water or steam. In a particular aspect of the invention the gaseous feed contains 0.1 wt. % or less of water, or 0.0001 wt. % to 0.1 wt. % water. The hydrocarbon material used in the reaction can be methane. The resulting syngas can then be used in additional downstream reaction schemes to create additional products. Such examples include chemical products such as methanol production, olefin synthesis (e.g., via Fischer-Tropsch reaction), aromatics production, carbonylation of methanol, carbonylation of olefins, the reduction of iron oxide in steel production, etc.

The reactant gas mixture can include natural gas, liquefied petroleum gas comprising $C_2$-$C_5$ hydrocarbons, $C_6$+ heavy hydrocarbons (e.g., $C_6$ to $C_{24}$ hydrocarbons such as diesel fuel, jet fuel, gasoline, tars, kerosene, etc.), oxygenated hydrocarbons, and/or biodiesel, alcohols, or dimethyl ether. In particular instances, the reactant gas mixture has an overall oxygen to carbon atomic ratio equal to or greater than 0.9.

The method can further include isolating and/or storing the produced gaseous mixture. The method can also include separating hydrogen from the produced gaseous mixture (such as by passing the produced gaseous mixture through a hydrogen selective membrane to produce a hydrogen permeate). The method can include separating carbon monoxide from the produced gaseous mixture (such as passing the produced gaseous mixture through a carbon monoxide selective membrane to produce a carbon monoxide permeate).

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of Catalysts

All materials for the synthesis of the bulk metal oxide catalysts were obtained from Sigma Aldrich Chemical Company.

$(Mg_{0.5}Ni_{0.5})_2SiO_4$ Bulk Metal Oxide Catalyst.

Figure 2:
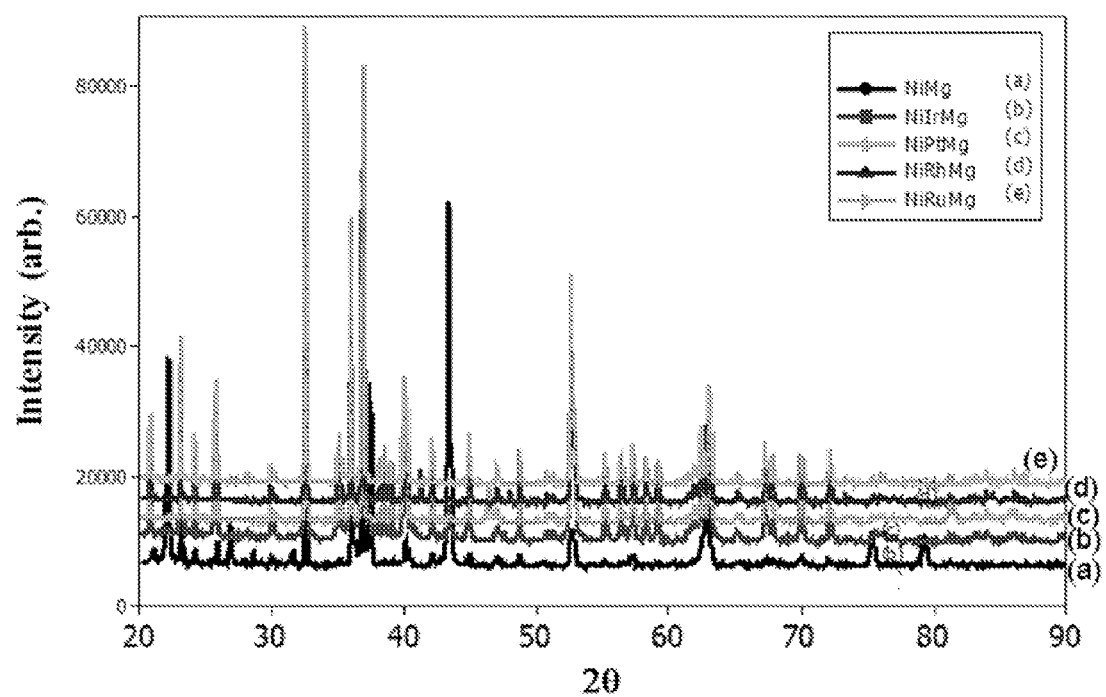
FIG. 2 shows X-Ray Diffraction (XRD) patterns of various bulk metal oxide catalysts of the invention.

Nickel oxide (4.26 g 0.057 moles), magnesium oxide (2.30 g, 0.057 moles) and silicon dioxide (3.43 g, 0.057 moles) were mixed together to form a homogeneous powder of NiO, MgO and $SiO_2$. The homogeneous powder was dried at 120° C. for 10 hours. The dried material was ground to a fine powder, and then pelletized (i.e., molded) with an infrared press at a pressure of about 10 tons to form cylindrical pellets. The formed pellets were calcined at 1300° C. at a ramp rate of 1° C. per minute, held at 1300° C. for 24 hours, and then cooled slowly to room temperature. The calcined pellets were crushed and ground to form a fine crystalline powder of $(Ni_{0.5}Mg_{0.5})_2SiO_4$, hereinafter "NiMg" catalyst. FIG. 2 are X-Ray Diffraction (XRD) spectra of various bulk metal oxide catalysts of the invention. As shown in FIG. 2, the NiMg catalyst has diffraction patterns relevant for olivine phases. These patterns are similar to an XRD spectra of natural olivine mineral.

$(Ca_{0.5}Ni_{0.5})_2SiO_4$ Bulk Metal Oxide Catalyst.

Nickel oxide (3.91 g 0.052 moles), calcium oxide (2.94 g, 0.052 moles) and silicon dioxide (3.15 g, 0.052 moles) were mixed together to form a homogeneous powder of NiO, CaO and $SiO_2$. The homogeneous powder was dried at 120° C. for 10 hours. The dried material was ground to a fine powder, and then pelletized with an infrared press at a pressure of about 10 tons to form cylindrical pellets. The formed pellets were calcined at 1300° C. at a ramp rate of 1° C. per minute, held at 1300° C. for 24 hours, and then cooled slowly to room temperature. The calcined pellets were crushed and ground to form a fine crystalline powder of $(Mg_{0.5}Ni_{0.5})_2SiO_4$, hereinafter "NiCa" catalyst.

Synthesis of Bulk Metal Oxide Catalysts Containing Noble Metals $(Mg_{0.5}Ni_{0.49}M^3{}_{0.01})_2SiO_4$, where $M^3$ is a Pt, Ru, Rh, Ir.

Nickel oxide, noble metal (II) salt, magnesium oxide, and silicon dioxide were mixed together in a molar ratio of 0.98(Ni):1(Ca):0.02(noble metal):1($SiO_2$) to form a homogeneous powder. The homogeneous powder was dried at 120° C. for 10 hours. The dried material was ground to a fine powder, and then pelletized with an infrared press at a pressure of about 10 tons to form cylindrical pellets. The formed pellets were calcined at 1300° C. at a ramp rate of 1° C. per minute, held at 1300° C. for 24 hours, and then cooled slowly to room temperature. The calcined pellets were crushed and ground to form a fine crystalline powder of $(Mg_{0.5}Ni_{0.49}M^3{}_{0.01})_2SiO_4$, hereinafter "NiMgPt", "NiMgRu", "NiMgRh", and "NiMgIr" catalysts. As shown in FIG. 2, the NiMgPt, NiMgRu, NiMgRh, and NiMgIr catalysts have diffraction patterns relevant for olivine phases.

Synthesis of Bulk Metal Oxide Catalysts Containing Noble Metals $(Ca_{0.5}Ni_{0.49}M^3{}_{0.01})_2SiO_4$, where $M^3$ is a Pt, Ru, Rh, Ir.

Nickel oxide, a noble metal (II oxidation state) salt, calcium oxide, and silicon dioxide were mixed together in a molar ratio of 0.98:1:0.02:1 to form a homogeneous powder. The homogeneous powder was dried at 120° C. for 10 hours. The dried material was ground to a fine powder, and then pelletized with an infrared press at a pressure of about 10 tons to form cylindrical pellets. The formed pellets were calcined at 1300° C. at a ramp rate of 1° C. per minute, held at 1300° C. for 24 hours, and then cooled slowly to room temperature. The calcined pellets were crushed and ground to form a fine crystalline powder of $(Ca_{0.5}Ni_{0.49}M^3{}_{0.01})_2SiO_4$, hereinafter "NiCaPt", "NiCaRu", "NiCaRh", and "NiCaIr" catalysts.

Synthesis of Supported Catalysts.

Different supported catalysts were prepared by incipient wetness impregnation or pore filling method by dissolving the known amount of respective metal precursors in pore volume equivalent of deionized water and impregnating the solution with Olivine support by dropwise addition of metals precursor solution. After the impregnation, the impregnated material was dried at 80° C. in an oven under the flow of air. Drying was continued at 120° C. for 2 hours followed by calcination at 850° C. for 3 hours.

Example 2

Dry Reforming of Methane with Bulk Metal Catalysts of the Invention

General Testing Procedure.

The effectiveness of catalysts of the invention towards carbon dioxide reforming of methane (CDRM, dry reforming of methane) were tested using a high throughput reactor system (hte, GmbH, Heidelberg, Germany). The reactors were of a plug flow design and constructed of steel with ceramic liners. The ceramic liner was 5 mm in diameter and 60 cm in length. The ceramic liner is considered to be inert and used to inhibit steel catalyzed cracking of methane. Catalyst pellets were crushed and sieved to a particle size of 300-500 micrometers. A required amount of catalyst sieve fraction was placed on top of inert material inside the ceramic liner. The catalyst in its oxidized state was heated to about 800° C. in the presence of 90% nitrogen ($N_2$) and 10% Ar. A mixture of 45% $CO_2$+45% $CH_4$+10% Argon (Ar) was used as feed. The mixture was provided to the reactor in 4 steps with 5 minute intervals, replacing the feed with equivalent amounts of nitrogen during the interludes. The reaction conditions are specified in the individual Examples. Gas chromatography was used for gas analysis with Ar being the internal standard. Methane and $CO_2$ conversion was calculated as follows:

$$CH_4 \text{ conversion} = \frac{\text{moles of methane converted}}{\text{moles of methane in feed}} \times 100$$

$$CO_2 \text{ conversion} = \frac{\text{moles of carbon dioxide converted}}{\text{moles of carbon dioxide in feed}} \times 100$$

The ratio of hydrogen ($H_2$) to carbon monoxide (CO) was calculated as follows $$H_2/CO \text{ ratio} = \frac{\text{moles of } H_2 \text{ in product}}{\text{moles of CO in product}} \times 100$$

CDRM Using Bulk NiMg Catalyst.

Figure 3:
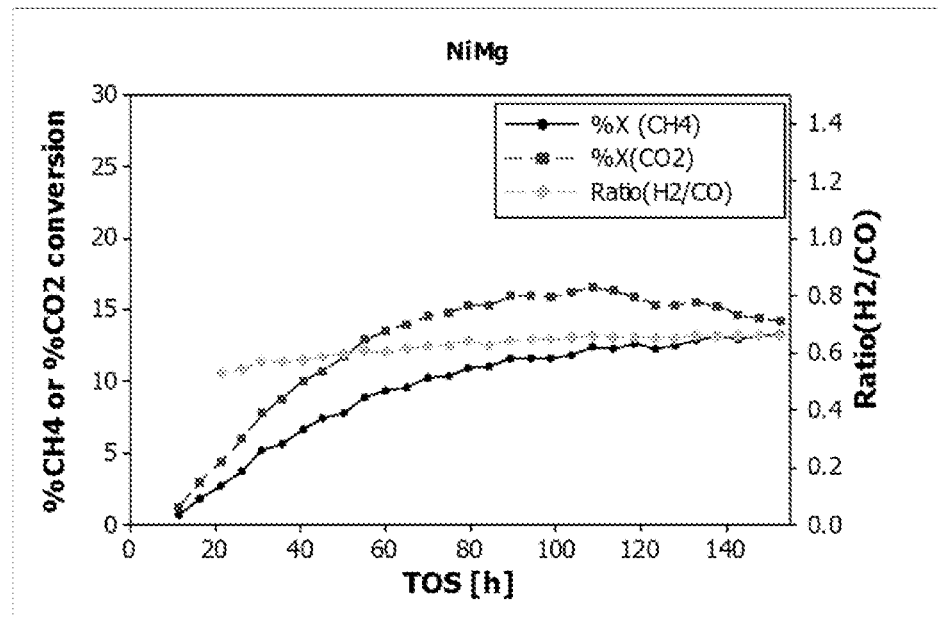
FIG. 3 is a graphical depiction of % methane or % carbon dioxide conversion and the ratio of hydrogen to carbon monoxide versus time, in hours for the bulk NiMg catalyst.

The bulk NiMg catalyst was tested at 800° C. at 1 bara, and a gas hourly space velocity (GSHV) of 83,500 h$^{-1}$ for 155 hours of operation. After 80 hours of operation, the percent conversion of methane was greater than 10%, the percent conversion of carbon dioxide was between 10 and 15%, and the $H_2$/CO ratio was greater than about 0.5. FIG. 3 is a graphical depiction of % methane or % carbon dioxide conversion and the ratio of hydrogen to carbon monoxide versus time, in hours.

CDRM Using Bulk NiMgPt Catalyst.

Figure 4:
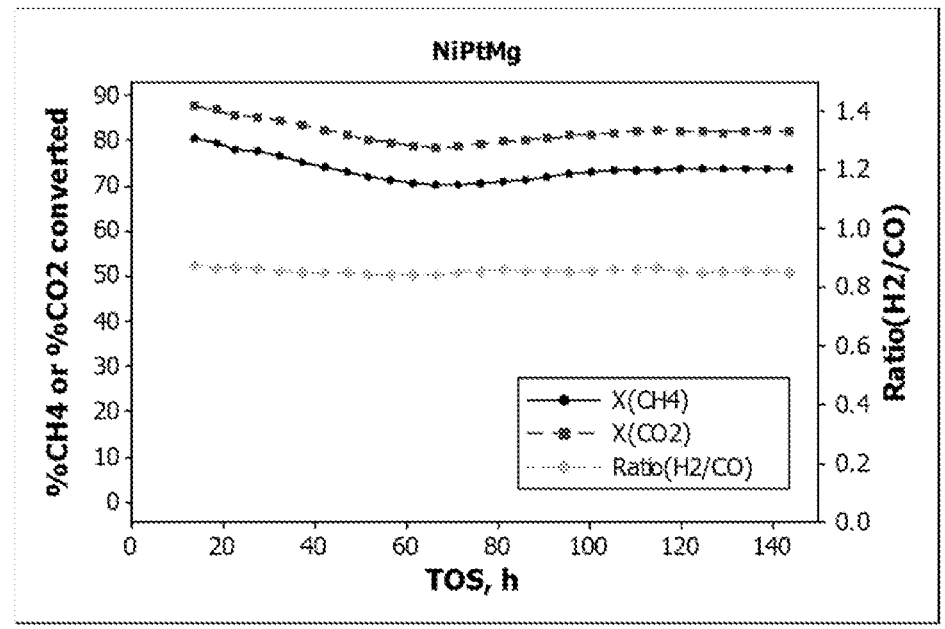
FIG. 4 is a graphical depiction of % methane or % carbon dioxide conversion and the ratio of hydrogen to carbon monoxide versus time, in hours for the bulk NiMgPt catalyst.

The bulk NiMgPt catalyst was tested at 800° C. at 1 bara, and a gas hourly space velocity (GSHV) of 25,000 h$^{-1}$ for 155 hours of operation. After 20 hours of operation, the percent conversion of methane was between 80 and 90%, the percent conversion of carbon dioxide was between 70 and 80%, and the $H_2$/CO ratio was greater than about 0.8. FIG. 4 is a graphical depiction of % methane or % carbon dioxide conversion and the ratio of hydrogen to carbon monoxide versus time, in hours for the bulk NiMgPt catalyst.

CDRM Using Bulk NiMgRu Catalyst.

Figure 5:
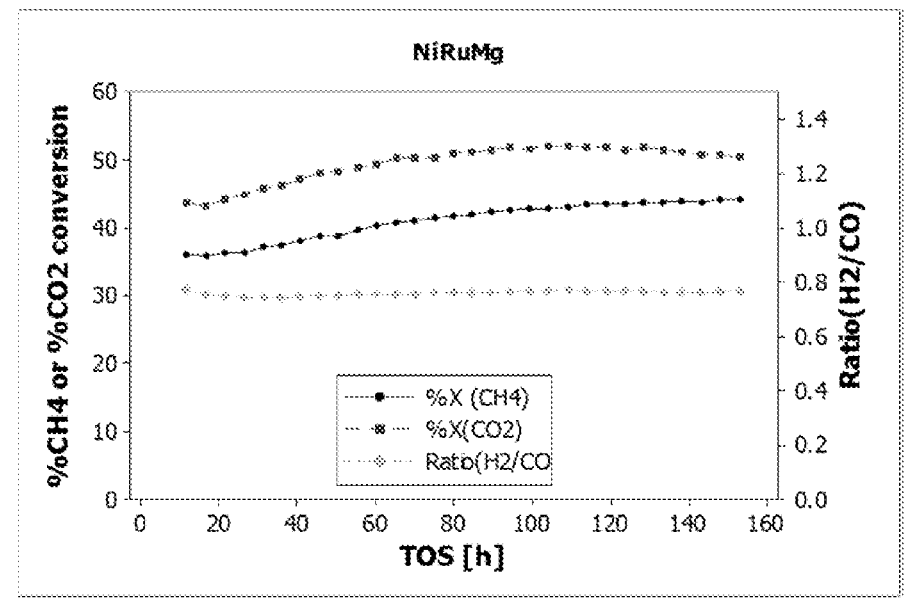
FIG. 5 is a graphical depiction of % methane or % carbon dioxide conversion and the ratio of hydrogen to carbon monoxide versus time, in hours for the bulk NiMgRu catalyst.

The bulk NiMgRu catalyst was tested at 800° C. at 1 bara, and a gas hourly space velocity (GSHV) of 83,500 h$^{-1}$ for 155 hours of operation. After 20 hours of operation, the percent conversion of methane was between 30 and 40%, the percent conversion of carbon dioxide was between 40 and 50%, and the $H_2$/CO ratio was about 0.8. FIG. 5 is a graphical depiction of % methane or % carbon dioxide conversion and the ratio of hydrogen to carbon monoxide versus time, in hours for the bulk NiMgRu catalyst.

CDRM Using Bulk NiMgIr Catalyst.

Figure 6:
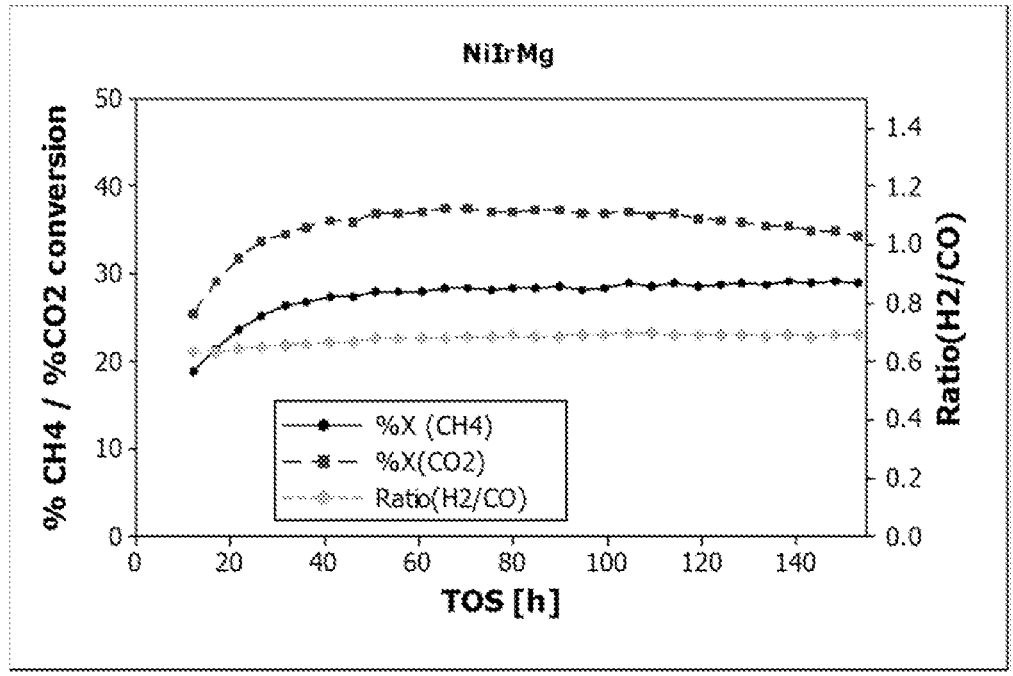
FIG. 6 is a graphical depiction of % methane or % carbon dioxide conversion and the ratio of hydrogen to carbon monoxide versus time, in hours for the bulk NiMgIr catalyst.

The bulk NiMgIr catalyst was tested at 800° C. at 1 bara, and a gas hourly space velocity (GSHV) of 83,500 h$^{-1}$ for 155 hours of operation. After about 30 hours of operation, the percent conversion of methane was between 20 and 30%, the percent conversion of carbon dioxide was between 30 and 40%, and the $H_2$/CO ratio was about 0.7. FIG. 6 is a graphical depiction of % methane or % carbon dioxide conversion and the ratio of hydrogen to carbon monoxide versus time, in hours for the bulk NiMgRu catalyst.

The $H_2$/CO ratio obtained from all the reactions was greater than 0.5 (See, FIGS. 3-6), with the catalysts containing noble metals having a $H_2$/CO of greater than 0.7. The reactions using bulk metal oxide catalysts containing a noble metal provided higher % conversion of methane and carbon dioxide in a shorter period of time than bulk metal oxide catalyst without noble metals. Further, the catalyst was found to be stable without any deactivation for 155 hours of duration. Notably, no sintering or coke formation was observed (no appearance of dark black color on catalysts) in any of these catalysts at temperatures above 800° C. The lack of coking was confirmed by performing a loss on ignition test of the used catalysts in an open atmosphere at 800° C. Sintering was studied by powder X-ray diffraction. Moreover, in general, catalyst which was synthesized at very high temperature (1100-1300° C.) will not sinter when applied at lower temperature (in present case 800° C.). Based on these results, the bulk metal oxide catalysts of the invention provide solutions to coking and sintering problems encountered during dry reforming of hydrocarbons.

The invention claimed is:

1. A bulk metal oxide catalyst capable of producing hydrogen ($H_2$) and carbon monoxide (CO) from methane ($CH_4$) and carbon dioxide ($CO_2$), wherein the bulk metal oxide catalyst consists of an olivine structure having a crystal lattice that has discrete $SiO_4$ anions and two metals ($M^1$, $M^2$) or three metals ($M^1$, $M^2$, $M^3$) in the crystal lattice, where each $SiO_4^{4-}$ has a Si cation and four $O^-$ anions
$M^2$ is a dry reforming of methane catalytic metal, and
the $O^-$ anions are coordinated with the metals in the crystal lattice, and wherein the bulk metal oxide catalyst does not include a carrier or a support.

2. The bulk metal oxide catalyst of claim 1, wherein $M^1$ comprises at least one metal from Groups IIA, VIB, VIIB, VIII, and Group IB or at least one compound thereof, and $M^2$ comprises at least one metal from Group IIIB, IVB, VIB, VIII or at least one compound thereof, or at least one lanthanide or at least one compound thereof, wherein $M^1$ and $M^2$ are different.

3. The bulk metal oxide catalyst of claim 1, wherein $M^2$ comprises nickel (Ni), scandium (Sc), zirconium (Zr), molybdenum (Mo), chromium (Cr), ruthenium (Ru), osmium (Os), rhodium (Rh), iridium (Ir), platinum (Pt), copper (Cu), palladium (Pd), dysprosium (Dy), thulium (Tm), ytterbium (Yb), lutetium (Lu), cerium (Ce), or any compound thereof.

4. The bulk metal oxide catalyst of claim 1, wherein $M^1$ comprises manganese (Mn), magnesium (Mg), calcium (Ca) or any compound thereof.

5. The bulk metal oxide catalyst of claim 1, wherein $M^1$ comprises Mg or a compound thereof, or Ca or a compound thereof, and $M^2$ comprises Ni or a compound thereof.

6. The bulk metal oxide catalyst of claim 1, wherein $M^3$ comprises a metal from Group VIII or a compound thereof, Group IB or a compound thereof, or both, and wherein $M^1$, $M^2$ and $M^3$ are different.

7. The bulk metal oxide catalyst of claim 6, wherein $M^3$ comprises Pt, Ru, Rh, Ir, Au, Ag, Pd or any compounds thereof.

8. The bulk metal oxide catalyst of claim 1, wherein the bulk metal oxide catalyst is represented by the formula of $(M^1_{(1-x)}M^2_x)_2SiO_4$, where $0<x\leq0.5$, and $M^1$ and $M^2$ are different.

9. The bulk metal oxide catalyst of claim 8, wherein $M^1$ is Mg or Ca, and $M^2$ is Ni.

10. The bulk metal oxide catalyst of claim 9, wherein the bulk metal oxide catalyst is $(Mg_{0.5}Ni_{0.5})_2SiO_4$, or $(Ca_{0.5}Ni_{0.5})_2SiO_4$.

11. The bulk metal oxide catalyst of claim 1, wherein the bulk metal oxide catalyst is represented by the formula of $(M^1_{(1-x)}M^2_xM^3_y)_2SiO_4$, where $0<x\leq0.5$, $0<y\leq0.05$ and $(x+y)\leq0.5$, and $M^1$, $M^2$, and $M^3$ are different.

12. The bulk metal oxide catalyst of claim 11, wherein $M^1$ is Mg or Ca, $M^2$ is Ni, and $M^3$ is Pt, Ru, Rh, or Ir.

13. The bulk metal oxide catalyst of claim 12, wherein the bulk metal oxide catalyst has the formula of $(Ni_{0.5}Mg_{0.5}M^3_{0.01})_2SiO_4$, where $M^3$ is Pt, Ru, Rh, or Ir.

14. The bulk metal oxide catalyst of claim 11, wherein the bulk metal oxide catalyst crystal structure comprises a hexagonal closest packed arrays of the $O^-$, a octahedral interstices, and a tetrahedral interstices, wherein one-half of the octahedral interstices are occupied by $M^1$ cations, $M^2$ cations, and/or $M^3$ cations, and one-eighth of the tetrahedral interstices are occupied by Si cations ($Si^+$).

15. The bulk metal oxide catalyst of claim 1, wherein $M^2$ is Ni.

16. A method of making a bulk metal oxide catalyst of claim 1, the method comprising:
(a) mixing $M^1$, $M^2$, and silicon dioxide ($SiO_2$) to form a mixture; and
(b) subjecting the mixture to conditions such that $M^1$, $M^2$, and $SiO_2$ form the bulk metal oxide catalyst.

17. The method of claim 16, wherein the mixture is molded to form a molded mixture, and wherein conditions comprise:
(a) heating the molded mixture to a temperature of about 1300° C. at a rate of 1° C.;
(b) holding the molded mixture at temperature of about 1300° C. for about 24 hours;
(c) cooling the hot molded mixture at a rate of about 1° C. to room temperature;
(d) crushing and grinding the molded mixture from step (c); and
(e) repeating steps (a) to (d).

18. A method of producing a gaseous mixture comprising contacting a reactant gas mixture comprising methane and an oxidant with the bulk metal oxide catalyst of claim 1 at a temperature of at least 800° C. to produce a gaseous mixture comprising hydrogen and carbon monoxide, wherein the catalyst is resistant to coke formation.

19. The method of claim 18, wherein the oxidant is carbon dioxide.

* * * * *